Nov. 25, 1941. L. T. WHITE 2,264,105
WORK FEEDING MECHANISM FOR MACHINE TOOLS
Filed March 28, 1941 4 Sheets-Sheet 1
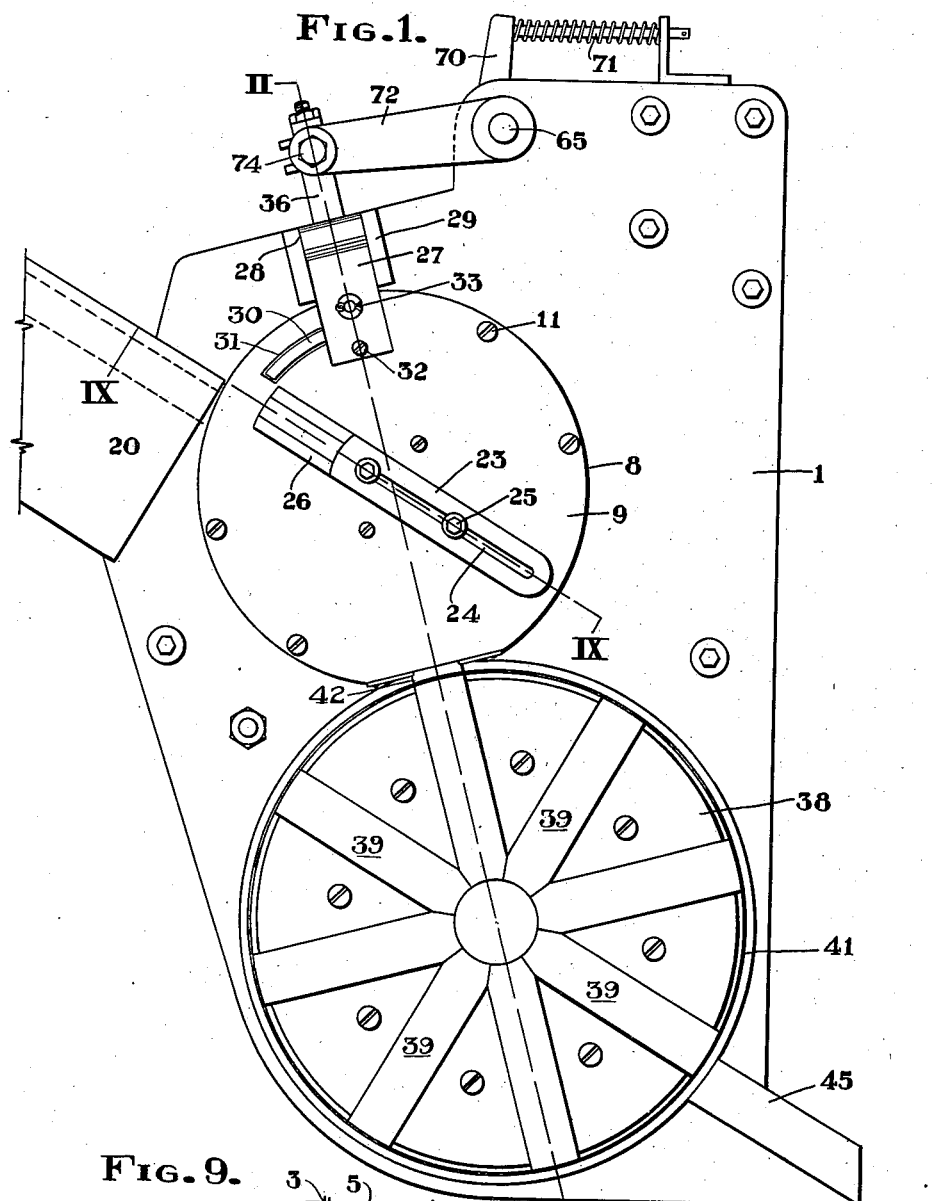
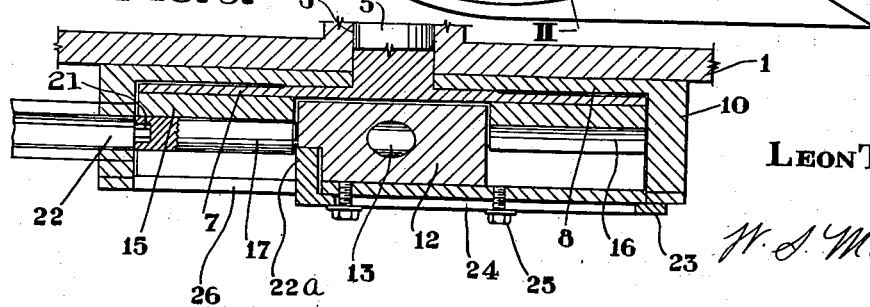
Inventor
Leon T. White
W. S. McDowell
Attorney Nov. 25, 1941.  L. T. WHITE  2,264,105
WORK FEEDING MECHANISM FOR MACHINE TOOLS
Filed March 28, 1941  4 Sheets-Sheet 2
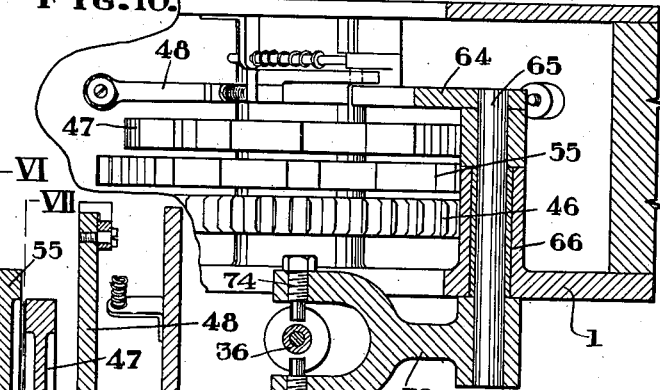
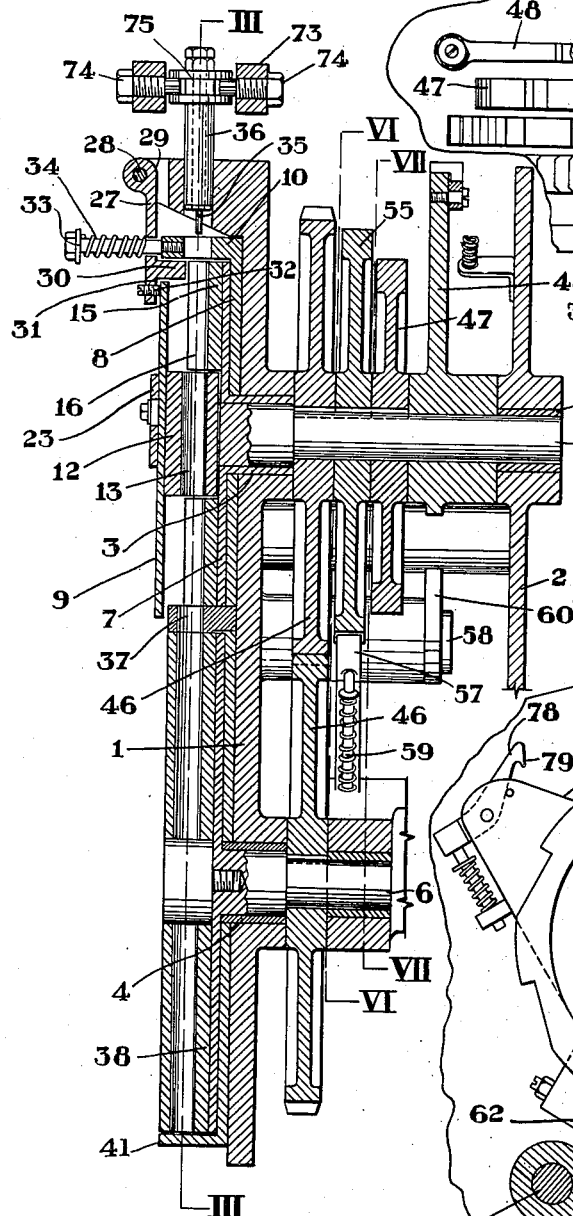
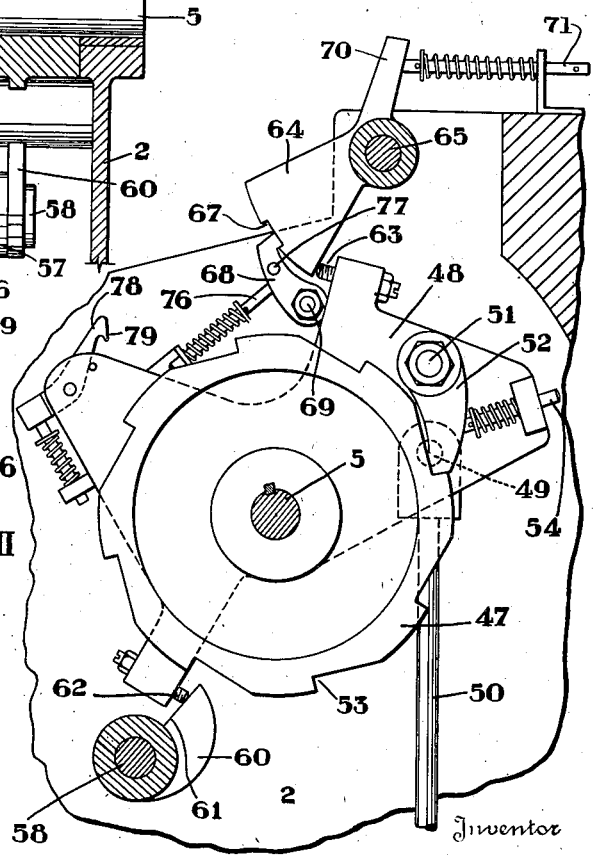
Inventor
LEON T. WHITE
By W. S. McDowell
Attorney

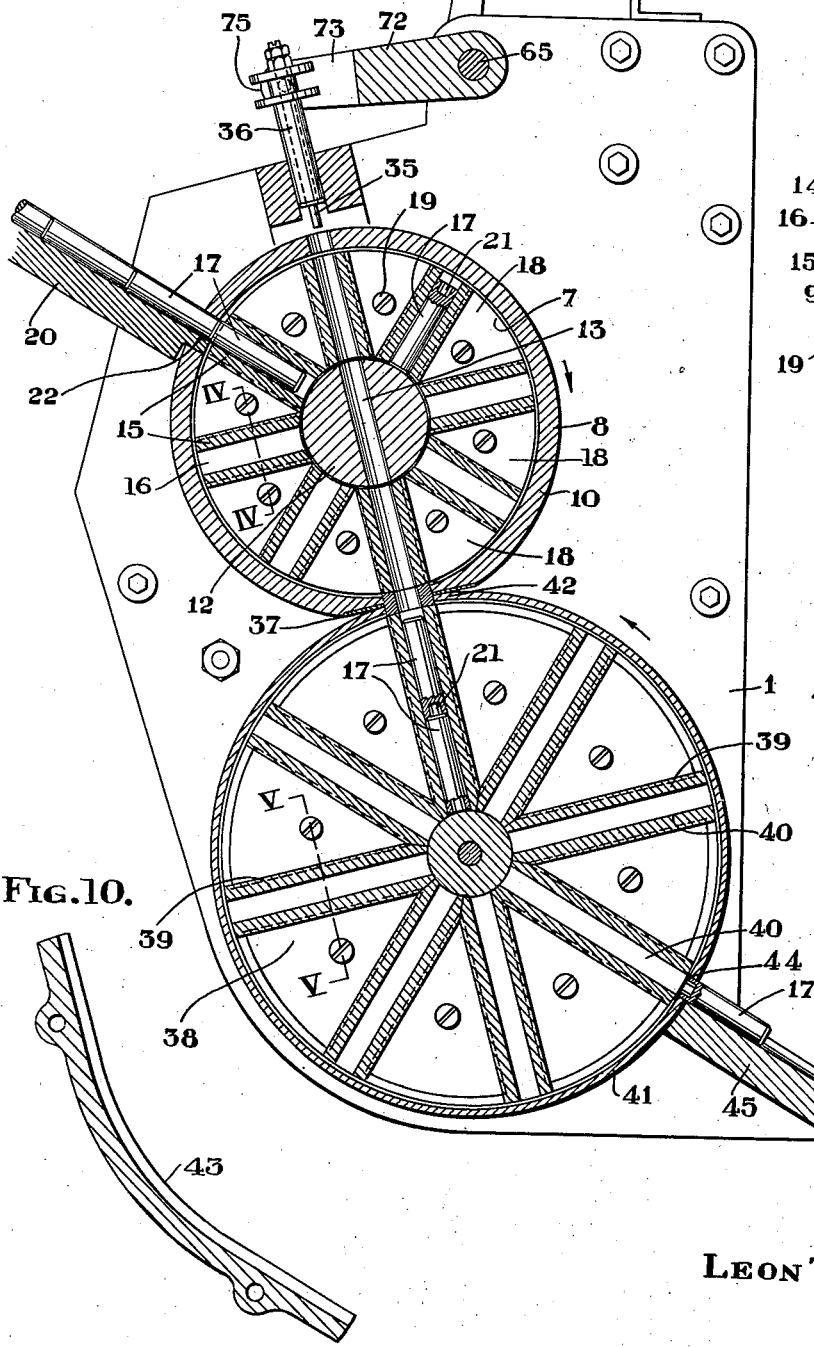

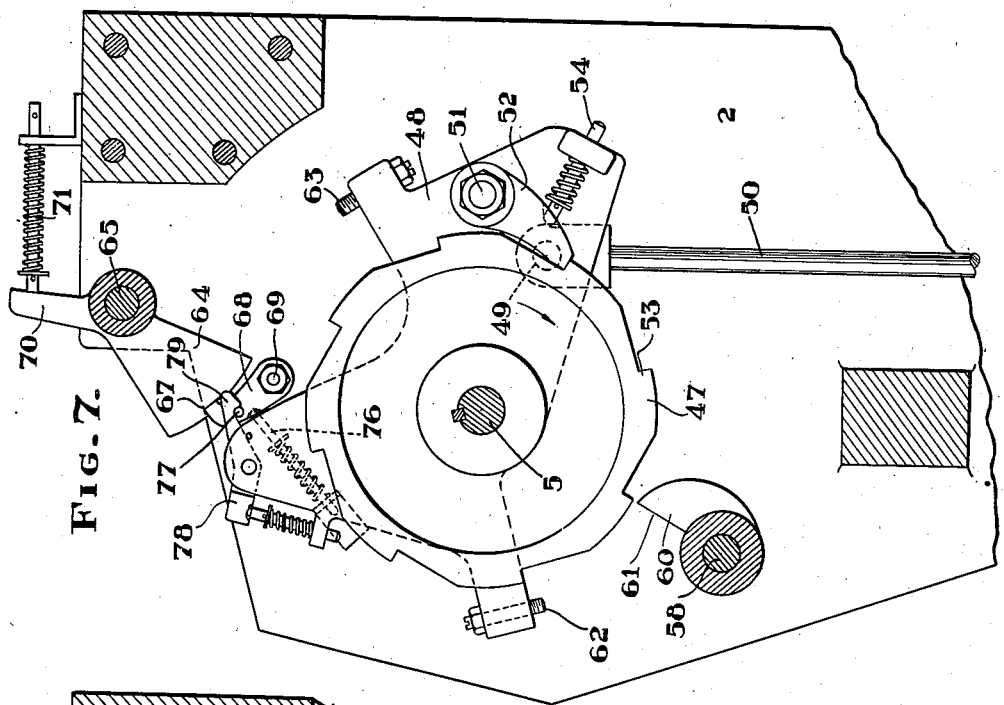
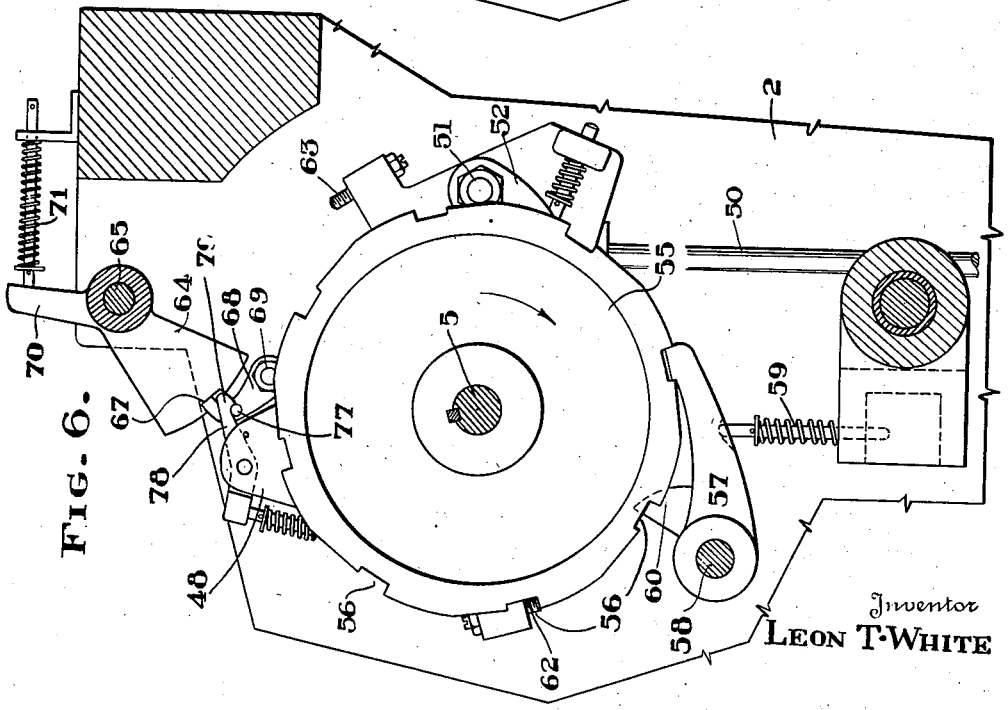

Patented Nov. 25, 1941

2,264,105

UNITED STATES PATENT OFFICE 2,264,105

WORK FEEDING MECHANISM FOR MACHINE TOOLS

Leon T. White, Painesville, Ohio

Application March 28, 1941, Serial No. 385,723

6 Claims. (Cl. 10—162)

This invention relates to feeding mechanism for machine tools and, with reference to its more specific aspects, is concerned with the feeding of cylindrical blanks from which set screws are formed to machine tools of the type employed for producing threads on the blanks. Set screws of the headless type are now being used in large quantities. These screws are formed from round bar stock and are usually threaded throughout their lengths, one end of such a screw being provided with a tool-receiving socket to admit of its being conveniently screwed into and out of threaded openings. Such set screws are desirable over the ordinary headed set screw in that they are inconspicuous when in their operative positions, may be completely embedded in a threaded body to produce flush surfaces and do not offer projecting ends or heads.

In the manufacture of such headless set screws, the bar stock is transversely severed at longitudinal intervals to produce blanks of desired length. These blanks are then punched or otherwise formed at one end of each thereof to produce a tool-receiving socket having hexagonal walls, or a plurality of other similar straight-sided angularly related walls. These sockets, when the blanks are being threaded, are adapted to receive the shank of a movable driver, or other tool, so that the blanks may be supported while being advanced into engagement with the threading dies.

These end-socketed blanks are difficult to feed by automatic means to a threading machine. When they are being handled in quantities, it is a troublesome and time-consuming operation to arrange the blanks longitudinally with the socketed ends thereof disposed in the required direction or relative order, since the tendency in the mass rapid feeding thereof is for the blanks to be indiscriminately presented to the threading machine insofar as their socketed ends are concerned. It is fairly simple to align the blanks longitudinally and feed them successively to the threading machine, but to accomplish this automatically with the socketed ends all facing in the same direction for required engagement with the driver element of a threading machine, has presented difficulties of considerable magnitude.

Accordingly, it is an object of the invention to provide novel and efficient apparatus for feeding and presenting set screw blanks of the type set forth to a threading instrumentality, the feeding and presenting of said blanks being such that the socketed ends of the successive blanks when delivered to the threaded instrumentality will all face in one direction.

Another object of the invention resides in the provision of a blank-feeding mechanism of the character set forth utilizing one or more revolving heads adapted for the reception of the blanks as the latter are discharged from an inclined way or chute, at least one of the heads being provided with a plurality of radially disposed holders into which the blanks are singly and successively received from the way or chute, there being means provided, operative upon the rotation of the head, to effect the discharge of the blanks from said holders with the socketed ends of the blanks disposed in uniform order.

For a further understanding of the invention and the constructions and operations employed thereby, reference is to be had to the following description and the accompanying drawings, wherein:

Fig. 1 is a view in side elevation of the blank feeding mechanism comprising the present invention;

Fig. 2 is a vertical transverse sectional view taken through the mechanism on the plane indicated by the line II—II of Fig. 1;

Fig. 3 is a vertical sectional view taken through the rotatable heads of the feeding mechanism on the plane indicated by the line III—III of Fig. 2;

Fig. 4 is a detail transverse sectional view disclosing the construction of the blank holders used by the primary head, the plane of the figure being indicated by the line IV—IV of Fig. 3;

Fig. 5 is a similar view of the blank holders employed by the secondary head, the plane of the figure being established by the line V—V of Fig. 3;

Fig. 6 is a vertical sectional view taken on the line VI—VI of Fig. 2, looking toward the rear of the mechanism, and disclosing more particularly the recessed lock wheel;

Fig. 7 is a similar view on the line VII—VII of Fig. 2 and disclosing the pawl and ratchet wheel construction for intermittently rotating the holder heads;

Fig. 8 is a view similar to Fig. 7 but disclosing the parts in different operating positions;

Fig. 9 is a transverse sectional view taken on the plane indicated by the line IX—IX of Fig. 1;

Fig. 10 is a detail side elevational view disclosing the supplemental chute which is employed when the secondary holder wheel is removed from the mechanism.

In the specific embodiment of the invention illustrated in the drawings, the blank feeding mechanism comprises a pair of vertically disposed, transversely spaced, stationary frame walls 1 and 2. These walls may be supported in any suitable manner in connection with the bed of an associated machine tool, not shown, such, for example, as a thread-forming machine. The walls 1 and 2 are formed with registering bearings 3 and 4 for the reception of horizontally extending, upper and lower shafts 5 and 6, respectively. Formed with the forward end of the shaft 5 is a primary disk-like head 7, which is rotatably mounted in a circular pocket provided within a stationary concentric housing 8, the latter being suitably fixed to the outer surface of the front wall 1. The front of the housing 8 is closed by means of a removable, substantially circular, cover plate 9, the latter being fastened to the flanged circumferential walls 10 of the housing 8 by means of screws or the like, as shown at 11. Also, attached to the inner face of the cover plate 9 and disposed axially within the circular chamber of the housing 8, is a circular plug 12 through which extends a diametrically disposed passage 13.

The front face of the head 7 is provided with a plurality of radially extending recesses 14, in which are seated, as shown in Figs. 3 and 4, a plurality of equally spaced, radially disposed, blank holders 15. Each holder extends from the circular outer wall of the plug 12 to the outer circumferential edge of the head 7. Further, each of the holders includes a longitudinally extending socket 16, substantially circular in cross section and being slightly larger in diameter than the set screw blank 17, which the holders are adapted to receive. The socket 16 of each holder opens to the front face of the holder, so that when a blank is positioned therein, a portion of the blank will project beyond the front or outer face of the holder, thus enabling the blank to be engaged by a clamping instrumentality, to be hereinafter described, while the blank is positioned in the holder. The holders 15 are retained in place by means of a plurality of V-shaped plates 18. The edges of the plates 18 enter recesses or grooves formed in the side walls of the holders 15, and screws 19 unite the plates 18 with the head 7, retaining the holders in their spaced radial positions on the head.

Leading from a hopper or magazine, not shown, in which the blanks 17 are contained, is a stationary inclined way or chute 20. The blanks 17 are advanced by gravity, or otherwise, in longitudinally aligned order along the chute, but since this is a gravitational movement without manual supervision, the socketed ends 21 of the blanks are not arranged in any prescribed order. The way or chute 20 terminates at its lower end contiguous to the circular outer wall 10 of the housing 8 in registration with an opening 22 in the wall 10. By the operation of means to be hereinafter described, intermittent rotary movement of equal increments is imparted to the head 7, causing the outer ends of the holders 15 to be successively registered with the chute opening 22, so that as the holders are aligned with said chute, each thereof will receive a blank 17. The inner ends of the blanks so positioned in the holders contact with the circular perimeter of the plug 12 or with an inturned lip 22a provided on an adjustable gage strip 23. This strip is formed with an elongated slot 24 and flatly engages the outer surface of the cover plate 9. Clamping screws 25 are used to maintain any given adjustment of the gage strip 23, so that the latter may be adapted to blanks of different lengths. The lip 22 of the gage strip extends through an opening 26 provided in the cover plate 9 and the inner edge of the lip 22 terminates immediately adjacent to the flat outer surface of the holders 15. Since the sockets 16 in said holders are not completely circular, the blanks 17 project beyond the same, the length of the lip 22 being such as to seat beneath the projecting end of a blank positioned within the socket 16 of a holder 15.

As the primary holder moves approximately 45 degrees from a position registering one of the holders 15 with the chute or way 20 to the next succeeding position, the holder which has just received a blank is aligned with the passage 13 formed diametrically in the plug 12. To prevent the blanks from undesirably dropping from the holder and entering the passage 13 by gravitational movement, a clamping instrumentality is provided for retaining the blanks so positioned in the holder. This instrumentality preferably comprises an arm 27, which has its upper edge hinged as at 28 between bifurcated extensions 29 projecting from the top portion of the wall 1. The inner face of the arm 27 at its lower region is provided with an inwardly extending lip 30, which is movably positioned in a slot 31 formed in the cover plate 9. A set screw 32, carried by the lower edge of the arm 27, may be adjusted to engage with the outer face of the plate 9 to limit or regulate the extent of inward movement of the lip 30. Also, projecting from the wall 10 of the housing 8 is a headed post 33, the shank of which passes through an opening provided in the arm 27.

Between the outer headed end of the post and the arm 27 is a coil spring 34. This spring surrounds the shank of the post and presses on the arm 27 to maintain its lip 30 in frictional contact with the sides of the blanks 17 which project beyond the front face of the holders 15.

By this construction, when the holders are brought into registration with the passage 13, see Fig. 3, the blanks will be held by the clamping action of the lip 30 within the holders and prevented from dropping through the passage 13, unless, as occurs in the present invention under certain conditions, the blank is positively displaced from engagement with the lip 30. If, when the holders register with the passage 13, the socketed ends 21 of the blanks 17 are disposed in a downward position, facing toward the plug 12. The reduced end 35 of a slidable plunger 36 is advanced to engage the closed end of the blank and force the same from its gripped engagement with the lip 30, thereby causing a blank so disposed to drop through the passage 13 and the passage of a diametrically aligned holder on the opposite side of the head for discharge from said head. If the socketed end 21 of a blank positioned in a holder which is aligned with the passage 13, is arranged toward the outer end of the holder, the movement of the plunger 36 is such that its reduced end 35 will merely enter the socket 21 in the end of the blank and will not displace a blank so positioned from its gripped engagement with the lip 30, thus enabling such a blank to remain in its original holder and continue its rotation for a given time in unison with the head.

In diametrical alignment with the passage 13, the outer wall 10 of the housing 8 is provided with an outlet opening 37 for the discharge of the blanks from the head. By this construction, it will be noted that the blanks 17 which are discharged from the head through the opening 37 all have the socketed ends thereof disposed in the same direction or relative order.

In certain machines, it is desirable to reverse the order of the socketed ends of the blanks with respect to their order of discharge from the primary head 7 through the opening 37. This may be accomplished by the provision of a secondary head 38, which is rotatably mounted on the lower shaft 6. The primary and secondary heads are very similar in construction, except that the blank receiving holders 39 of the secondary head are approximately twice the length of the holders 15 of the primary head.

In addition, the holders 39, as shown in Fig. 5, are formed with completely circular sockets 40 for the reception of the blanks, there being no occasion in the operation of the secondary head to grip the blanks as provided for in the primary head in the spring-pressed arm 27.

The secondary head is surrounded by a stationary circular casing 41 fastened to the wall 1, the upper portion of the casing 41 being formed with an opening 42 which registers with the discharge opening 37 of the casing or housing 8. The increased length of the holders 39 with respect to the holders 15 is required because when a blank is displaced from the primary holder by the action of the plunger 36, two of the blanks will be released from the primary holder for simultaneous entry into the holders of the secondary head. If it is unnecessary to reverse the positions of the blanks, as accomplished by the operation of the secondary head, the latter head may be removed from its applied position on the wall 1 and a curved supplemental chute 43 attached to the wall 1 in lieu thereof.

The outer circumferential wall of the casing 41 is provided with a blank-discharging opening 44, which is adapted to be brought into registration with an inclined guide 45, the latter leading to the machine tool. Likewise, when the chute 43 is used, its lower or discharge end will register with the stationary guide 45. The primary and secondary heads are simultaneously rotated by means of intermeshing gears 46 fixed upon the shafts 5 and 6, and disposed between the walls 1 and 2, as in Fig. 2. If it is desired to rotate the secondary head in the same direction of rotation as the primary head, an intermediate or idler gear, not shown, may be positioned for intermeshing engagement with the pair of gears shown at 46.

In order to impart rotary movement of an intermittent nature to the shaft 5, the latter has keyed thereto a ratchet wheel 47. Loosely mounted on the shaft 5, between the wheel 47 and the frame wall 2, is a quadrant lever 48. This lever is pivotally attached as at 49 to the upper end of a crank-actuated throw rod 50. As this rod rises and falls through prescribed limits of movement, corresponding oscillatory motion is imparted to the lever 48. Pivotally mounted as at 51 on the lever 48 is a pawl 52, the outer end of which engages with the spaced ratchet teeth 53 of the wheel 47. A spring-pressed pin 54, carried by the lever 48, is employed to positively retain the pawl 52 in contact with the teeth 53 in all positions of the lever 48. By this means, intermittent rotary movement of equal increments is imparted to the shaft 5 and the primary and secondary heads.

To hold the primary and secondary heads stationary upon return movement of the quadrant 48, and while the primary head has its holders aligned with the receiving chute 21 and the plunger 36, there is keyed to the shaft 5 a lock wheel 55. This wheel has its perimeter provided with a plurality of equally spaced recesses 56, the latter being adapted for successive engagement with the free end of a detent 57, which is carried by a shaft 58 journaled in connection with the frame walls. Positive engagement of the free end of the detent with the peripheral portion of the lock wheel is obtained by the provision of a spring pressed pin 59, also, suitably supported for limited sliding movement in connection with the frame walls.

To withdraw the detent 57 from locking engagement with the recesses 56 and to provide for the rotation of the primary head, the shaft 58 also carries a cam extension 60, as shown in Figs. 7 and 8. This extension is formed with a face 61 which is radial to the center of the shaft 58, and disposed for engagement with the shaft 51 is one end of an adjustable screw 62 carried by the quadrant lever 48. When the quadrant lever occupies its maximum position of elevation, as shown in Fig. 8, the screw 62 contacts the face 61 to partially rotate the shaft 58, causing the detent 57 to be released from the recesses of the wheel 55 and against the resistance offered by the spring-pressed pin 59. When the quadrant lever is moved downwardly from its position as disclosed in Fig. 8 to its lowered position as disclosed in Fig. 7, sufficient rotary movement is allowed the lock wheel 55 before the detent 57 reengages the lock wheel to prevent the free end of the detent from entering the same recess 56 with which it was immediately prior thereto engaged. In other words, after rotation of the lock wheel is initiated, the return of the detent causes its free end to engage with the perimeter surfaces of the lock wheel until the next succeeding recess is aligned with the free end of the detent.

The quadrant lever 48 is also employed to effect the timed actuation of the plunger 36. As shown in Fig. 8, the quadrant lever carries a second set screw 63 which may be maintained in desired positions of adjustment. When the quadrant lever is rocked in an upward direction, the set screw 63 will, before the lever reaches its extreme upper position, contact with a segmental crank arm 64 fixed to one end of a rock shaft 65, the latter shaft being journaled as at 66 in connection with the upper portion of the wall 1. The outer arcuate edge of the arm 64 is notched as at 67 for engagement with the inturned end of a dog 68 which is pivoted as at 69 in connection with the frame wall structure. The arm 64 carries an upwardly extending finger 70 with which is engaged a slidable spring-pressed pin 71.

When the dog 68 is removed from engagement with the notch 67, the pin 71 will serve to rotate the rock shaft 65. The end of the rock shaft opposed to that which receives the crank arm 64, has secured thereto a crank 72 having a forked outer end 73. Diametrically opposed screws 74 are carried by the forked end 73 and have their inner reduced ends positioned in an annular groove 75 formed in connection with the upper end of the plunger 36. It will be seen that when the dog 68 is freed from engagement with the crank arm 64, the action of the spring-pressed pin 71 will be to sharply rotate the rock shaft so that the crank 72 will be rocked in a downward direction to impart corresponding movement to the plunger 36. This action takes place when the primary head is at rest and following successive registration of the holders 15 with the plunger 36.

The dog 68 has its free end normally forced into engagement with the arcuate edge of the arm 64 through the agency of a spring-pressed pin 76, which is slidably mounted in connection with guides carried by the frame wall structure. Also, the dog 68 is formed with an outwardly projecting stud 77. Mounted on the quadrant lever 48 is a pivoted catch 78, the hooked end 79 of which is adapted to engage with the stud 77 when the quadrant lever has been moved to its lowermost position, as disclosed in Fig. 7. When the quadrant lever is moved upwardly toward the position indicated in Fig. 8, the resulting motion thereof will cause the catch 78 to swing the dog 68 against the resistance of the pin 76 so that the free end of the dog will be disengaged from the notch in the arcuate edge of the arm 64, thus allowing for the motion of the rock shaft in effecting the actuation of the plunger 36. Normal engagement of the dog 68 with the crank arm 64 is restored by the screw 63 of the quadrant lever 48 contacting with one of the radial edges of the arm 64.

In view of the foregoing, it will be seen that the present invention provides comparatively simple and efficient means for automatically feeding and presenting end-socketed set screw blanks to a machine tool, with the blanks having their socketed ends disposed in a prescribed order. The apparatus functions in an automatic manner and does not require the services of a manual operator. The mechanism is readily adjustable to conform to blanks of different lengths, and likewise, the holders 15 and 39 are replaceable to receive blanks of varying diameter.

While what is considered to be a preferred embodiment of the invention has been described, nevertheless it will be understood that the same is subject to considerable modification without departing from the scope of the invention, as the latter has been set forth in the following claims.

What is claimed is:

1. Apparatus for feeding and presenting end-socketed set screw forming blanks in prescribed order to a threading tool, comprising a feed chute through which said blanks are advanced in longitudinally aligned order with their socketed ends indiscriminately disposed, a rotatable head having a plurality of spaced radially extending blank-receiving holders, means for imparting intermittent rotary motion to said head to effect successive registration of said holders with said chute, whereby to position a blank in each holder as registered, and means for discharging the blanks from said head following predetermined increments of rotary movement of the head with the socketed ends of the successive blanks so discharged disposed in the same relative order.

2. Apparatus for feeding and presenting screw blanks to machine tools, said blanks being of the type wherein each blank has one end thereof formed with an inwardly extending socket, comprising a rotatable head having a plurality of spaced radially extending blank-receiving holders, means for imparting intermittent equal increments of rotary movement to said head, means for introducing blanks into said holders with the socketed ends of the blanks arranged indiscriminately toward the inner or outer ends of the holders, and means for effecting discharge of the blanks from said holders following predetermined movement of the head with the socketed ends of the blanks disposed in the same relative order.

3. Blank feeding apparatus for machine tools, comprising a rotatable head having a plurality of radially extending blank-receiving sockets, a stationary inclined way upon which end-socketed machine tool blanks are advanced in longitudinally aligned order with the sockets of the blanks disposed indiscriminately at one end or the other thereof, means for imparting intermittent rotary movement to said head to successively register the radial sockets thereof with said way, whereby to deposit in each of said sockets one of said blanks, means operable upon the rotation of said head to yieldably engage the blanks disposed in said head sockets immediately following turning movement of said head from said way, and a plunger movable toward the blanks positioned in said head sockets, said plunger serving to displace the blanks from the head when the blanks occupy positions in said head sockets with their closed ends disposed in adjacent relationship to the plunger and when the socketed ends of the blanks contained within the head are disposed immediately adjacent to the plunger, the positions of the blanks in the head remain uneffected by the entrance of the plunger into said end sockets.

4. Apparatus for feeding cylindrical end-socketed blanks to machine tools, comprising a rotatable head having a plurality of radially disposed holders for said blanks, means for positioning the blanks in each of said holders with the socketed ends of the blanks indiscriminately disposed, means for imparting intermittent rotary movement to said head, a movable plunger mounted independently of said head and adapted to be brought into successive registration with said holders, and means for moving said plunger when the head is stationary to displace blanks from said holders which have their closed or unsocketed ends disposed immediately adjacent to said plunger.

5. In apparatus for feeding cylindrical blanks to machine tools, a rotatable head, a plurality of radially disposed blank-receiving holders rotatably carried by said head and rotatable in unison therewith, means for feeding blanks of the type having an end socket in each thereof to said head to cause the blanks to occupy said holders with the socketed ends of the blanks indiscriminately disposed, a stationary plug member mounted in the axis of said head in concentric relation to the inner ends of said holders, said plug member being provided with a diametrically extending passageway, resilient gripping means engageable with the blanks in said holders when the latter are in registration with said passageway, and movable ejector means disposed in registration with one end of a holder aligned with said passageway, said ejector means serving to displace blanks engaged by said gripping means for travel through said passageway while the unsocketed ends of the blanks are disposed toward the outer ends of the holders.

6. In mechanism for feeding end-socketed set screw blanks to machine tools, a stationary casing having a circular chamber, a head rotatably mounted in said chamber, a plurality of radially arranged blank-receiving holders supported by said head for rotation in unison therewith, an inlet in the circumference of said casing registrable with said holders for successively introducing said blanks into said holders with the socketed ends of the blanks disposed toward either the inner or outer ends of the holders, a blank discharging outlet in the circumferential wall of said casing spaced from said inlet, means for imparting intermittent rotary motion to said head for maintaining the same stationary while the holders are aligned with said inlet and outlet, a plug member stationarily carried by said casing and disposed in the axis of said chamber in concentric relation with the inner ends of said holders, said plug member being provided with a passage extending diametrically therethrough, a movable plunger stationarily supported with respect to said head and disposed contiguous to an opening in the circumferential wall of said casing, said opening being spaced from the blank inlet, and means operable between periods of intermittent rotary motion of said head to advance said plunger into ejecting engagement with blanks having their unsocketed ends disposed toward the outer ends of said holders, whereby the blanks displaced by said plunger are caused to travel through the passage of said plug member for final discharge through said outlet.

LEON T. WHITE.